United States Patent [19]

Chyung et al.

[11] Patent Number: 5,164,341
[45] Date of Patent: Nov. 17, 1992

[54] FIBER REINFORCED CERAMIC MATRIX COMPOSITES EXHIBITING IMPROVED HIGH-TEMPERATURE STRENGTH

[75] Inventors: Kenneth Chyung, Painted Post; John L. Stempin, Beaver Dams; Dale R. Wexell, Corning, all of N.Y.

[73] Assignee: Corning Incorporated, Corning, N.Y.

[21] Appl. No.: 266,829

[22] Filed: Nov. 3, 1988

[51] Int. Cl.$^5$ .................. C03C 10/06; C03C 14/00
[52] U.S. Cl. ............................ 501/8; 501/9; 501/32; 501/95; 428/378; 428/902
[58] Field of Search ............ 501/8, 9, 32, 95; 428/378, 388, 902

[56] References Cited

U.S. PATENT DOCUMENTS

| | | | |
|---|---|---|---|
| 4,376,803 | 3/1983 | Katzman | 428/408 |
| 4,376,804 | 3/1983 | Katzman | 428/408 |
| 4,397,901 | 8/1983 | Warren | 428/101 |
| 4,405,685 | 9/1983 | Honjo et al. | 428/368 |
| 4,481,257 | 11/1984 | Suplinskas et al. | 428/366 |
| 4,485,179 | 11/1984 | Brennan et al. | 501/32 |
| 4,589,900 | 5/1986 | Brennan et al. | 65/33 |
| 4,615,987 | 10/1986 | Chyung et al. | 501/8 |
| 4,642,271 | 2/1987 | Rice | 428/697 |
| 4,755,489 | 7/1988 | Chyung et al. | 501/8 |

OTHER PUBLICATIONS

R. L. Stewart et al., "Fracture of SiC Fiber/Glass-Ceramic Composites as a Function of Temperature," in *Fracture Mechanics of Ceramics*, R. C. Bradt et al. Ed., vol. 7, pp. 33–51, Plenum, N.Y., 1986.

*Primary Examiner*—William R. Dixon, Jr.
*Assistant Examiner*—Karl Group
*Attorney, Agent, or Firm*—Kees van der Sterre

[57] ABSTRACT

Fiber-reinforced ceramic matrix composite products comprising boron-nitride-coated reinforcing silicon carbide fibers disposed in a substantially non-porous alkaline earth aluminosilicate glass-ceramic matrix are disclosed, the matrix comprising triclinic anorthite ($CaO,SrO.Al_2O_3.2SiO_2$) as the principal crystal phase and the products exhibiting unexpectedly good resistance to high-temperature degradation.

5 Claims, 1 Drawing Sheet

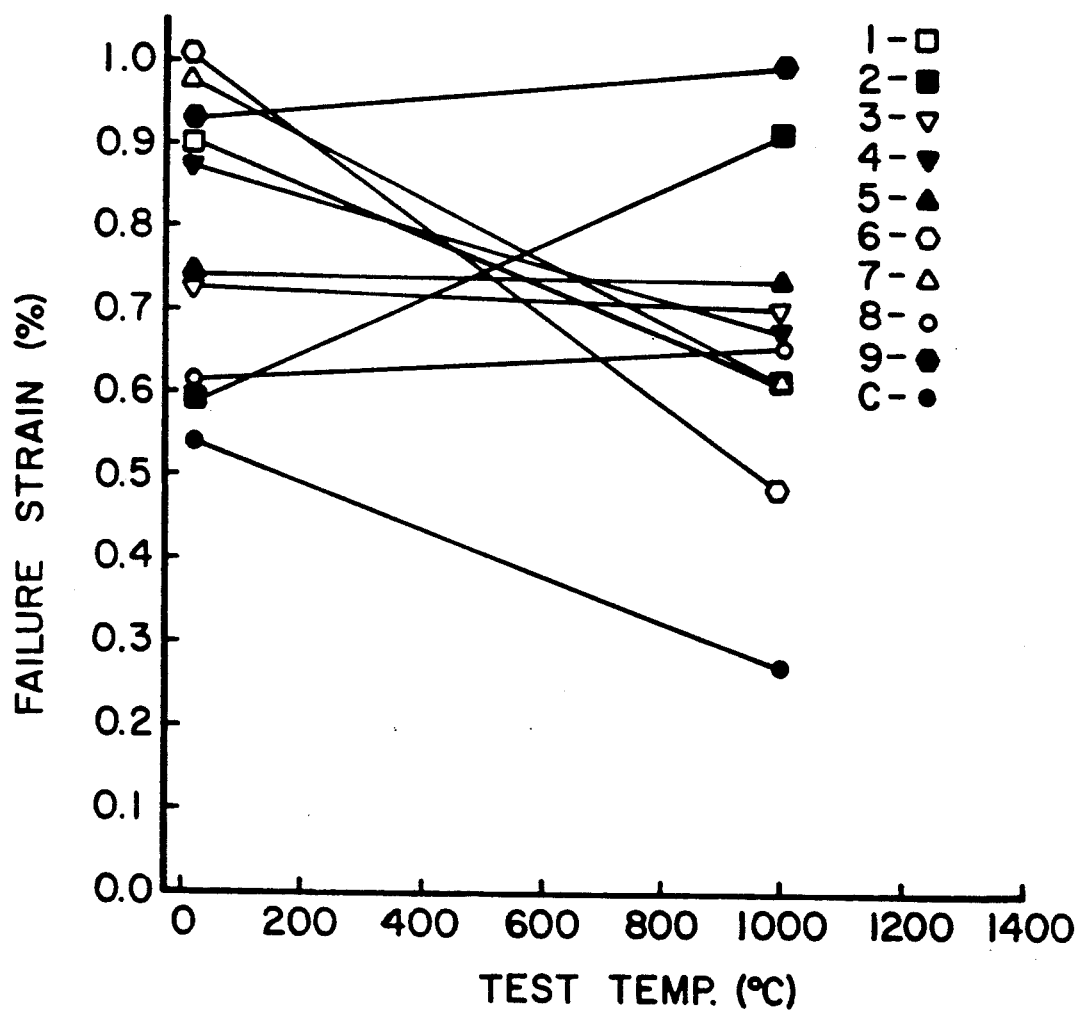

FIBER REINFORCED CERAMIC MATRIX COMPOSITES EXHIBITING IMPROVED HIGH-TEMPERATURE STRENGTH

The present invention relates generally to fiber-reinforced composites wherein the matrix consists of a glass-ceramic material, and more particularly to ceramic matrix composites wherein the matrix is an alkaline earth aluminosilicate glass-ceramic and the reinforcing fibers are silicon carbide fibers comprising a protective boron nitride coating.

Fiber-reinforced ceramic matrix composites comprising glass-ceramic matrices are well known. U.S. Pat. No. 4,615,987 discloses silicon carbide fiber reinforced glass-ceramic composites wherein the matrix consists of an alkaline earth aluminosilicate glass-ceramic composition. Similar silicon-carbide-reinforced composites wherein the matrix consists of a barium-modified magnesium aluminosilicate glass-ceramic are reported in U.S. Pat. No. 4,589,900. And U.S. Pat. No. 4,755,489 discloses SiC-reinforced glass-ceramics wherein the glass-ceramic matrix contains excess $Al_2O_3$ and consists predominantly of anorthite in combination with mullite or alumina.

Prospective uses for fiber-reinforced ceramic matrix composites such as described in these and other prior patents and literature include use as a structural element in high temperature environments such as heat engines. Thus the materials to be employed must not only exhibit good strength and toughness at ambient temperatures, but must also retain those desirable physical properties at the elevated temperatures encountered in the operating environment. Temperatures in the range of 700°–1000° C. and highly oxidizing conditions (due to the high-temperature activity of oxygen) are considered representative of the operating conditions to be encountered.

An important problem which has been identified in silicon carbide reinforced ceramic matrix composites in this temperature regime is that of high temperature embrittlement. Hence, instead of exhibiting high toughness and strength after exposure to temperatures in the operation ranges desired, these materials become brittle and subject to sudden catastrophic breakage, rather than more gradual failure as typical of the original material. While the exact mechanism of embrittlement has not been fully explained, oxidative deterioration of the fiber-matrix interface is the probable cause. See, for example, R. L. Stewart et al., "Fracture of SiC Fiber/Glass-Ceramic Composites as a Function of Temperature," in *Fracture Mechanics of Ceramics*, R. C. Bradt et al. Ed., Volume 7, pages 33–51, Plenum (New York) 1986.

It is known to provide coatings on fiber reinforcement to be incorporated in composite materials in order to modify the behavior of the materials or the fibers therein. Specifically, the use of boron nitride coatings on silicon carbide fibers or other fibers to be incorporated in ceramic matrix materials such as $SiO_2$, $ZrO_2$, mullite, and cordierite is known in the art. Thus U.S. Pat. No. 4,642,271 suggests that the high-temperature strength and toughness of a composite comprising an $SiO_2$ matrix and SiC reinforcing fibers may be significantly improved by coating the fibers with BN. This effect was, however, found to be dependent on the composition of both the fibers and the matrix, as the same fibers in other matrix materials did not always yield improved results. Thus, for example, BN-coated SiC fibers did not improve the characteristics of cordierite or $ZrO_2$ composite ceramics.

Other coating systems and coating matrix combinations are also known. U.S. Pat. No. 4,276,804, for example, describes the application to carbon fibers of a metal oxide film intended to improve fiber adhesion and wetting by a molten metallic matrix material. U.S. Pat. No. 4,397,901 describes a composite article and method for making it wherein a woven or non-woven fiber substrate, typically composed of carbon fibers, is provided with successive coatings of pyrolytic carbon, diffused silicon, and silicon carbide to provide a composite article resistant to corrosive conditions. U.S. Pat. No. 4,405,685 describes a similar coating system for carbon fibers wherein an inner coating consisting of a mixture of carbon and a selected metal carbide, in combination with an outer coating consisting solely of the metal carbide, are described. This dual coating system is intended to provide enhanced fiber protection for fibers to be embedded in ceramic or particularly metal matrix materials.

U.S. Pat. No. 4,481,257 discloses silicon carbide monofilaments coated with boron or boron carbide. These filaments exhibit improved strength and bonding when used with metal or epoxy matrix materials. U.S. Pat. No. 4,485,179 describes the use, in a ceramic matrix composite comprising silicon carbide fibers, of an agent added to the matrix to reduce interaction with the silicon carbide fibers. Tantalum or niobium compounds are useful for this purpose.

U.S. Pat. No. 4,605,588 discloses a process for providing a boron nitride surface coating on ceramic fibers such as aluminoborosilicate fibers. The boron nitride surface coating is reportedly effective to reduce reaction bonding of the fiber to the glass or ceramic matrix, thereby preserving the necessary toughening mechanisms in the composite system. U.S. Pat. Nos. 4,376,803 and 4,376,804, supra, describe composite coatings consisting of amorphous carbon and an overlayer of a metal oxide such as $SiO_2$ to be applied to carbon fibers in order to improve fiber adhesion to molten metal matrix materials such as magnesium and magnesium alloys. U.S. Pat. No. 3,869,335 describes metal coated fibers and metal-glass coated fibers which can be incorporated into glass matrix materials to provide products which exhibit higher ductility than conventional products.

While the foregoing patents and literature indicate a general interest in the development of coatings for fibers to be employed for the reinforcement of composite glass, metal and ceramic materials, the problem of embrittlement of ceramic matrix composites comprising silicon carbide reinforcing fibers remains.

It is a principal object of the present invention to provide a fiber-reinforced glass-ceramic matrix composite comprising silicon carbide fibers which exhibits improved resistance to embrittlement under adverse high temperature conditions.

It is a further object of the invention to provide a method for making silicon carbide-reinforced glass-ceramic matrix composites which provides products of improved strength and/or toughness at high temperatures.

Other objects and advantages of the invention will become apparent from the following description thereof.

SUMMARY OF THE INVENTION

The present invention is founded upon the discovery that vapor-deposited boron nitride coatings, when applied to silicon carbide fibers to be incorporated into alkaline earth aluminosilicate glass-ceramic matrix materials to provide reinforced glass-ceramics, can impart unexpectedly high resistance to high temperature embrittlement to the resulting composite materials. Thus the invention includes, in one aspect, a fiber-reinforced ceramic matrix composite comprising reinforcing silicon carbide fibers disposed in a substantially non-porous alkaline earth aluminosilicate glass-ceramic matrix, and wherein the silicon carbide fibers are provided with a vapor deposited boron nitride surface coating. The coating may be of conventional composition and may be applied by conventional means.

Fiber-reinforced ceramic matrix composites containing BN-coated SiC fibers have been made in accordance with the invention which exhibit very high levels of retained ultimate flexural strength at temperatures in the critical temperature range of 700°–1000° C. Further, these results appear to be achievable without significant reductions either in the ambient temperature properties of the composites or in the high temperature microcrack behavior of the materials.

In a second aspect, the invention includes an improved method for making a fiber-reinforced glass-ceramic matrix composite article. In the general conventional method, such composites are made by embedding inorganic reinforcing fibers in a ceramic matrix material, and thereafter consolidating the fibers and ceramic matrix material with heat and pressure to provide a substantially non-porous ceramic material having the fibers embedded therein. In the improved method, prior to the step of embedding the fibers in the matrix material, the fibers are first provided with a vapor-deposited boron nitride surface coating. Such coatings have been found very effective to preserve the characteristic ambient strength and toughness of SiC-reinforced alkaline earth aluminosilicate at elevated temperatures.

The reasons for the unexpected effectiveness of these coatings to reduce high-temperature embrittlement in ceramic matrix composites are not fully understood. Presumably, however, variables such as adherence to the fibers, chemical compatibility with the fibers and matrix, stability in the high-temperature oxidizing environment and other factors combine in such a way as to effectively protect or modify the fibers or the fiber-matrix interface in the treated materials.

The high-temperature characteristics of the composites of the invention make them particularly suitable for use in applications involving exposure to high temperatures and wherein it is critical to retain a known or predictable level of strength and/or toughness in the composite material in the course of prolonged exposure to such environment.

DESCRIPTION OF THE DRAWING

The invention may be further understood by reference to the drawing, which is a graph plotting test temperature versus sample elongation at failure for a fiber-reinforced glass-ceramic matrix composite article provided in accordance with the invention.

DETAILED DESCRIPTION

As previously noted, a principal object of the present invention is to mitigate the effect of embrittlement which is typically observed during or following heating of silicon carbide-reinforced composites above 700° C. in air. This embrittlement is generally manifested by a decrease in fracture toughness and, typically, a change in the fracture habit of the material from one characterized by fiber pullout from the matrix to one wherein woody or brittle fracture occurs. Woody fracture surfaces display some crack propagation parallel to the stress axis, indicating localized shear failure but without fibrous pullout. Brittle fracture surfaces display merely planar fracture surfaces as the composite exhibits no plastic deformation.

It has been surmised that embrittlement arises from an oxidation of the surfaces of the fibers, which typically comprise carbon-rich interfacial layers thought to play a role in toughness enhancement in these systems. Microcracks in the composite material at high temperatures could allow oxygen to penetrate to the fiber surfaces, destroying or damaging the carbon-rich layer.

The invention is not limited to any particular type of silicon carbide fibers. Thus useful fibers may comprise any of the known types of silicon carbide fibers, including silicon carbide fibers produced by the oxidation of polymers. The latter typically include significant amounts of oxygen in their composition, and on occasion are alternatively designated silicon oxycarbide fibers in the art. Alternatively, fibers which consist essentially of vapor deposited silicon carbide, and which are therefore substantially free of oxygen, may be used. All of these fiber types will hereinafter simply be referred to as silicon carbide fibers.

An example of a suitable silicon carbide fiber material which is commercially available is Nicalon ® silicon carbide fiber. This material can be purchased as fiber tow or woven fiber mat from the Nippon Carbon Company of Japan.

In contrast to the fiber reinforcement material, the selection of the matrix material for the composite of the invention is deemed to be of primary importance in achieving the objects of high initial strength and good high temperature strength retention in the composite. As known in the art, the performance of BN as a surface coating material for SiC fibers for composite reinforcement varies strongly and in an unpredictable way depending on the composition and/or morphology of the matrix material selected for combination with the fibers. Thus, for example, U.S. Pat. No. 4,642,271 indicates little utility for the high-temperature strengthening or toughening of matrix materials such as $ZrO_2$ ceramics, or even of cordierite ($MgO-Al_2O_3-SiO_2$) alkaline earth aluminosilicate ceramics.

A key feature of the present invention is the unexpectedly high strength and toughness achievable in composites comprising BN-coated fibers, provided that an appropriate alkaline earth aluminosilicate glass-ceramic matrix is employed. Thus certain alkaline earth aluminosilicate glass-ceramics have proven to be particularly adaptable to high temperature strengthening by BN-coated SiC fibers.

Among the alkaline earth aluminosilicate glass-ceramics presently considered useful for the production of glass-ceramic matrix composites in accordance with the present invention are those selected from the following two groups of known glass-ceramic materials:

I. glass-ceramics wherein the predominant crystal phase is selected from the group of triclinic anorthite ($CaO,SrO \cdot Al_2O_3 \cdot 2SiO_2$) and its pseudo-binaries with mullite ($3Al_2O_3 \cdot SiO_2$), cordierite ($2MgO \cdot 2Al_2O_3 \cdot 5SiO_2$), barium osumilite ($BaO \cdot 2MgO \cdot 3Al_2O_3 \cdot 9SiO_2$), albite solid solution ($Na_2O \cdot Al_2O_3 \cdot 6SiO_2$), $Al_2O_3$, $SiO_2$, $CaO \cdot SiO_2$, and gehlenite ($2CaO \cdot Al_2O_3 \cdot SiO_2$); and II. internally nucleated glass-ceramics wherein the predominant crystal phase consists essentially of triclinic anorthite ($CaO,SrO \cdot Al_2O_3 \cdot SiO_2$) and at least one of mullite and α-alumina, the alumina content of the glass-ceramic being from 10–50 mole percent in excess of that of stoichiometric triclinic anorthite.

Glasses crystallizable to the Group I glass-ceramics above described are known, and have been utilized in the manufacture of whisker-containing ceramic matrix composites as reported, for example, in U.S. Pat. No. 4,615,987. Such glasses typically have a composition consisting essentially, in weight percent on the oxide basis, of about 0–25% $CaO$, 0–30% $SrO$, 10–30% $CaO+SrO$, 25–38% $Al_2O_3$, 35–60% $SiO_2$, 0–25% $BaO$, 0–15% $MgO$, 0–4% $Na_2O$, 0–6% $K_2O$, 0–12% $TiO_2$, 0–15% $ZrO_2$, 0–3% $As_2O_3$ and 0–30% total of $BaO+MgO+Na_2O+K_2O+TiO_2+ZrO_2+As_2O_3$.

Glasses crystallizable to the Group II glass-ceramics above described are also known, having been described in U.S. Pat. No. 4,755,489 and typically having a composition within the range, in weight percent, of about 16–20% $CaO$, 38.5–46% $Al_2O_3$, 35–42% $SiO_2$, 0.25–1.5% $As_2O_3$, and up to 10% total of at least one nucleating agent selected in the indicated proportion from the group consisting of 0.1–3% $Cr_2O_3$, 0.25–3% $HfO_2$, 2–5% $MoO_3$, 0.25–3% $Nb_2O_5$, 0.25–3% $Ta_2O_5$, 0.25–3% $WO_3$, and 1–10% $ZrO_2$. In these glasses, $Al_2O_3$ is present in the composition in an amount which is at least 5 mole percent and up to 50 mole percent in excess of that present in stoichiometric triclinic anorthite.

As known in the art, reinforcing fibers such as silicon carbide fibers can conveniently be incorporated into glass-ceramic matrix materials such as above described if the matrix materials are provided as glasses in particulate or powdered form. Such particulate matrix materials may readily be produced from glasses by converting the molten glass to a glass frit and then grinding, ballmilling, or otherwise processing the glass frit to form a fine glass powder. Glass powders produced in this manner can readily be applied to fibers by coating the fibers with liquid suspensions of the powders. Typically, the powders will be suspended in a suitable coating vehicle comprising dispersants and binder constituents, and then the resulting suspension is applied to fibers, fiber tows or fiber mats by spraying, immersion in the suspension, or other technique.

Fiber mats or tows impregnated with powdered glass as described may then be pressed or wound onto drums to provide green sheets or prepregs of the glass-impregnated fibers. These may then be stacked, if desired, and heated to achieve burnout of organics present in the coating vehicle.

Consolidation of the green prepregs or stacks thereof is typically accomplished by a hot pressing process during which the temperature is raised above the softening temperature of the glass and pressure is applied to eliminate voids in the material and produce a dense composite. In the case of glass-ceramic matrix materials such as employed in the invention, crystallization of the matrix material is usually achieved concurrently with consolidation in the course of the hot pressing process.

The invention may be further understood by reference to the following examples which set forth specific illustrative embodiments thereof.

EXAMPLES 1-9

The fibers making up a number of silicon carbide fiber tows are first provided with vapor-deposited boron nitride surface coatings. The selected fiber tows are commercially available as Nicalon® NLM 202 fiber tows, each tow consisting of approximately 500 SiC fibers of substantially cylindrical cross-section. The individual fibers have diameters of about 10–15 microns, and as supplied include a polyvinyl acetate sizing material which is removed from the fiber surfaces by pyrolysis prior to the actual deposition of the nitride coating.

The presently preferred NLM 202 fiber tows are commercially vapor-coated tows obtained from the Synterials company of Herndon, Va., USA. Some of the tows are BN-coated utilizing borazine as a source compound, while others are coated in an atmosphere comprising $BCl_3$ and ammonia. Best results in terms of coating performance are achieved in the present composites are achieved by carrying out the deposition over a 10 minute interval under a vacuum of 0.3 torr at 960° C., using reactant flow rates of 4.31 g/min $BCl_3$ and 0.77 g/min $NH_3$. The final thickness of the BN coatings thus provided is approximately 0.2 microns.

The fiber tows incorporating BN-coated fibers produced as described are next combined with a powdered alkaline earth aluminosilicate glass precursor for a glass-ceramic matrix material. The precursor consists of a powdered calcium aluminosilicate glass having an oxide composition, in weight percent, of about 40.8% $SiO_2$, 39.7% $Al_2O_3$, 19.0% $CaO$, and 0.5% $As_2O_3$. This glass is melted and converted to glass frit by drigaging, and the frit is then ballmilled using alumina grinding media to achieve an average particle size of about 10–15 microns for the milled glass. The composition of this glass is such that it can be converted to a highly crystalline anorthite glass-ceramic matrix material upon suitable heat treatment at an appropriate point in the manufacture of the composite.

A suitable suspension of the powdered glass useful for coating the silicon carbide fiber tows with the matrix powder is next prepared by combining 315 parts by weight of the glass with a liquid vehicle consisting of about 700 parts by weight of isopropyl alcohol, 70 parts water, 52.2 parts polyvinyl acetate, 7 parts of a dispersant, and 7 parts of diethylene glycol. The dispersant used is commercially available as Katapo ™ VP532 dispersant from the GAF Corporation, Wayne, N.J.

A fiber reinforced composite preform incorporating the boron-nitride-coated silicon carbide fiber tows is next formed by drawing the tows through the suspension of powdered matrix and winding the suspension-impregnated tows onto a drum to form a cylindrical fiber layup. After drying, the winding is cut from the drum and stretched flat, and preform sheets are cut from the flattened winding for subsequent processing. Suitably, the cut sheet samples are preliminarily heated to evaporate residual solvent materials therefrom and then processed through a burnout step to remove organic binders. Burnout comprises heating the samples in nitrogen to a temperature of about 450° C.

Thick panels of composite material are prepared from these preforms by stacking and consolidating the sheet samples with heat and pressure. Stacks of eight sample sheets in fiber-parallel alignment are consolidated by hot pressing the stacks to a temperature in the range of about 1200°–1360° C. at a pressure in the range of about 1500–3000 psi. This treatment removes voids from the material and converts the glass powder matrix to a dense crystalline glass-ceramic matrix wherein the principal crystal phase is anorthite.

Another effect of hot pressing as described, if temperatures of about 1340°–1360° C. are utilized, is the generation in situ of a graphitic carbon layer on the surfaces of the silicon oxycarbide fibers. This carbon layer is generally 100–400 Å in thickness and creates, in effect, a multiple coating on the fiber consisting of a graphitic carbon layer with an overlayer of BN.

Nine fiber-reinforced composite samples produced in accordance with the above-described procedure are evaluated for resistance to embrittlement by a strength testing procedure in the course of which they are tested for microcrack yield stress and ultimate flexural strength both at ambient temperature (25° C.) and at an elevated test temperature of 1000° C. While the residence time at the elevated temperature is short, it is sufficient to produce substantial embrittlement in conventional ceramic composite materials.

Table I below reports the results of these strength and microcrack yield tests for the nine samples thus produced, and for one control sample produced from fiber tows comprising uncoated SiC fibers. Included in Table I for each of the samples are an indication of the source compound (BN precursor) used for vapor depositing the BN coating on the fibers, as well as data concerning the consolidation conditions used to convert the preform to a dense glass-ceramic matrix composite.

Additional data reported in Table I includes measured values at 25° C. and at 1000° C. for microcrack yield stress (MCY) and ultimate flexural strength (UFS), in thousands of pounds per square inch (ksi). The strength values are as determined for the strong axis of the material, i.e., the axis parallel to the direction of the fiber reinforcement in the material. Also given are indications of the primary fracture mode observed for selected samples, reported as fiber pull-out fracture (F), woody fracture (W), or brittle fracture (B).

TABLE I

| Sample No. | BN Precursor | Consolidation Treatment |
|---|---|---|
| 1 | borazine | 1340° C.–1500 psi |
| 2 | borazine | 1200° C.–3000 psi (1 hr) then to 1360° C., then to 1200° C. (1 hr)–3,000 psi |
| 3 | BCl$_3$, NH$_3$ | same as 1 |
| 4 | BCl$_3$, NH$_3$ | same as 1 |
| 5 | BCl$_3$, NH$_3$ | same as 2 |
| 6 | BCl$_3$, NH$_3$ | 1250° C.–1500 psi |
| 7 | BCl$_3$, NH$_3$ | same as 1 |
| 8 | BCl$_3$, NH$_3$ | same as 1 |
| 9 | BCl$_3$, NH$_3$ | same as 2 |
| Control | (none) | same as 1 |

| | At 25° C. | | | At 1000° C. | | |
|---|---|---|---|---|---|---|
| Sample No. | MCY (Ksi) | UFS (Ksi) | Fracture Mode | MCY (Ksi) | UFS (Ksi) | Fracture Mode |
| 1 | 48 | 109 | F | 35 | 66 | F |
| 2 | 23 | 73 | W/F | 29 | 99 | W/F |
| 3 | 69 | 110 | W | 39 | 62 | W |
| 4 | 84 | 136 | W/F | 31 | 69 | W/F |
| 5 | 73 | 118 | W | 26 | 75 | W/F |
| 6 | 52 | 156 | F | 39 | 57 | F |
| 7 | 51 | 102 | F | 41 | 68 | F |
| 8 | 27 | 83 | F/W | 38 | 59 | F |
| 9 | 29 | 122 | W/F | 45 | 99 | W/F |
| Control | 45 | 85 | F | 35 | 45 | W/B |

[Fracture Modes: (W) woody; (F) fibrous; (B) brittle]

A particularly significant feature of the invention as shown by the data in Table I is the high level of retained strength of the samples comprising BN-coated fibers at 1000° C. Thus, in all cases, the materials retain ultimate flexural strengths in excess of 58 ksi when tested at 1000° C. Equally important are the manifestations of tough fracture morphology retained at elevated temperatures. For example, samples 1 and 2 show at least some fiber pullout at 1000° C., behavior which is in marked contrast with that shown by the control sample.

An additional feature of interest, indicated by the drawing, is the retention of a high level of failure strain, which is the percent elongation of the sample at the point of flexural failure. The drawing consists of a graph plotting failure strain as percent elongation versus strength test temperature for each of the samples in Table I. The control sample, comprising uncoated SiC fibers, shows a reduction in failure strain to a value of about 0.25% at 1000° C. This low failure strain is one indicator of the high level of embrittlement of the composite material.

In contrast, the samples provided in accordance with the invention, which show relatively high initial (25° C.) levels of failure strain, also show better retention during testing at 1000° C. Hence the majority of the test samples demonstrate an ultimate failure strain at 1000° C. exceeding about 0.5%. Example 9, a preferred embodiment comprising BN-coated NLM-202 fibers coated in accordance with the optimum vapor deposition process described above, exhibited failure strains above 0.9% at both 25° C. and 1000° C. This characteristic is suggestive of the relative toughness or ruggedness of these materials.

It is also noted that the BN coating produces toughness in these composites whether an in situ carbon layer is present or not. Therefore, BN acts as a functional interface as does graphitic carbon. This reflects the graphitic structure of the BN coating itself.

Examples of other matrix materials selected from among the disclosed classes of alkaline earth aluminosilicate glass-ceramic matrix materials useful for the manufacture of fiber-reinforced composites in accordance with the invention are reported in Table II below. Like the matrix material more particularly described in the Example, these materials may be provided as powdered glasses, combined with BN-coated silicon nitride fibers by any convenient procedure, and consolidated and crystallized in situ with the fibers to provide glass-ceramic matrix composite products using layup and hot-pressing methods well known in the art.

TABLE II

| | A | B | C | D | E | F | G | H |
|---|---|---|---|---|---|---|---|---|
| SiO$_2$ | 42.4 | 43.66 | 50.63 | 53.2 | 45.6 | 48.1 | 35.4 | 40.8 |
| Al$_2$O$_3$ | 36.0 | 37.11 | 27.66 | 25.0 | 36.2 | 35.6 | 45.0 | 39.7 |
| CaO | — | — | — | 14.1 | 8.1 | 16.5 | 19.0 | — |
| BaO | 6.0 | 6.20 | 13.27 | 12.5 | — | — | — | — |
| MgO | 12.6 | 13.03 | 3.44 | 8.4 | 4.4 | 8.3 | — | — |
| As$_2$O$_3$ | 0.68 | 0.70 | 1.0 | 1.0 | 0.5 | 0.5 | 0.05 | 0.5 |
| ZrO$_2$ | 3.0 | — | — | — | — | — | 3.0 | — |
| Cr$_2$O$_3$ | — | — | — | — | — | — | — | 0.1 |

Referring more particularly to the compositions in Table II, Examples A and B represent glass compositions which are thermally crystallizable to barium-stuffed cordierite as the predominant crystal phase, while compositions C and D form barium osumilite and compositions E and F form anorthite as predominant crystal phases. Compositions G and H represent glasses which are thermally crystallizable to glass-ceramic materials wherein the predominant crystal phase is triclinic anorthite in solid solution with one or both of mullite and/or alumina. All of the compositions are reported in weight percent as calculated from the batch.

The precise composition of the silicon carbide fibers employed to strengthen the composites of the invention has thus far not been determined to play a role in the enhanced high temperature performance resulting from the application of BN coatings thereto. However, we have not seen evidence, at least in the alkaline earth aluminosilicate matrix systems of interest for the present invention, that BN coatings are effective to impart good high temperature properties to composites wherein fibers other than SiC fibers are used.

One system evaluated for comparison consists of BN-coated mullite fibers disposed in a matrix consisting of the alkaline earth aluminosilicate glass-ceramic matrix of the Example. In this system, the mullite fibers used are Nextel ™ 480 mullite fibers, commercially available from the 3M Company. As in the Example, these fibers are provided with a boron nitride coating approximately 0.2 microns in thickness by vapor deposition prior to use. Composites are prepared from these fibers utilizing the fiber layup and consolidation procedures of the Example.

Samples of composites of this type, hot-pressed at 1340°-1360° C., have been found to demonstrate ultimate flexural strengths of only 48 ksi at 25° C., and approximately 29.8 ksi at 1000° C., with only brittle to woody fracture observed. The microcrack yield stresses for such samples have been measured at about 39.8 ksi at 25° C. and at about 29.8 ksi at 1000° C. Generally then, while the initial or ambient temperature strengths achieved in this composite system are more than twice that observed for corresponding composites comprising uncoated mullite fibers, it is found in all cases that the improved initial strengths are significantly degraded upon exposure to 1000° C. test temperatures. Thus these composites exhibit high-temperature strengths which are unacceptably low for most composite applications.

One fundamental problem is that commercial mullite fibers have limited stability at temperatures of 1000° C. and above. Thus hot pressing of composites comprising these fibers at temperatures of 1200°-1360° C. results in degradation of the fiber itself, thereby limiting the potential strengthening and/or toughening effects of any fiber coating. Since the alkaline earth aluminosilicate glass-ceramics useful for the fabrication of the inventive composites require processing to at least 1200° C., it is apparent that mullite fibers with BN coatings have essentially no utility therein.

We claim:

1. A fiber-reinforced glass-ceramic matrix composite article exhibiting improved high-temperature strength and toughness having a matrix consisting essentially of an alkaline earth aluminosilicate glass-ceramic matrix in which are disposed reinforcing inorganic fibers having a protective coating thereon, wherein:

the inorganic fibers consist essentially of silicon carbide fibers;

the inorganic fibers are coated with vapor deposited boron nitride; and the alkaline earth aluminosilicate glass-ceramic matrix is a glass-ceramic selected from the group consisting of:

I. glass-ceramics wherein the predominant crystal phase is selected from the group of triclinic anorthite ($CaO,SrO \cdot Al_2O_3 \cdot 2SiO_2$) and its pseudo-binaries with mullite ($3Al_2O_3 \cdot SiO_2$), cordierite ($2MgO \cdot 2Al_2O_3 \cdot 5SiO_2$), barium osumilite ($BaO \cdot 2MgO \cdot 3Al_2O_3 \cdot SiO_2$), albite solid solution ($Na_2O \cdot Al_2O_3 \cdot 6SiO_2$), $Al_2O_3$, $SiO_2$, $CaO \cdot SiO_2$, and gehlenite ($2CaO \cdot Al_2O_3 \cdot SiO_2$); and II. internally nucleated glass-ceramics wherein the predominant crystal phase consists essentially of triclinic anorthite ($CaO,SrO \cdot Al_2O_3 \cdot SiO_2$) and at least one of mullite and α-alumina, the alumina content of the glass-ceramic being from 10-50 mole percent in excess of that of stoichiometric triclinic anorthite, said composite article exhibiting, when tested for flexural strength at 1000° C., an ultimate strength in excess of 58 ksi and a strain at flexural failure of at least about 0.5%.

2. A fiber-reinforced glass-ceramic matrix composite article in accordance with claim 1 wherein the matrix has a composition consisting essentially, in weight percent on the oxide basis, of about 0-25% CaO, 0-30% SrO, 10-30% CaO+SrO, 25-38% $Al_2O_3$, 35-60% $SiO_2$, 0-25% BaO, 0-15% MgO, 0-4% $Na_2O$, 0-6% $K_2O$, 0-12% $TiO_2$, 0-15% $ZrO_2$, 0-3% $As_2O_3$%, and 0-30% total of $BaO+MgO+Na_2O+K_2O+TiO_2+ZrO_2+As_2O_3$.

3. A fiber-reinforced glass-ceramic matrix composite article in accordance with claim 1 wherein the matrix has a composition, in weight percent on the oxide basis, of about 16-20% CaO, 38.5-46% $Al_2O_3$, 35-42% $SiO_2$, 0.25-1.5% $As_2O_3$, and up to 10% total of at least one nucleating agent selected in the indicated proportion from the group consisting of 0.1-3% $Cr_2O_3$, 0.25-3% $HfO_2$, 2-5% $MoO_3$, 0.25-3% $Nb_2O_5$, 0.25-3% $Ta_2O_5$, 0.25-3% $WO_3$, and 1-10% $ZrO_2$, and wherein the proportion of $Al_2O_3$ is 5-50 mole percent in excess of the proportion of $Al_2O_3$ in stoichiometric triclinic anorthite.

4. In the process for making a ceramic matrix composite article wherein inorganic reinforcing fibers are embedded in a ceramic matrix material and the fibers and ceramic matrix material are thereafter consolidated together into a dense ceramic matrix composite article by the application of heat and pressure thereto, the improvement wherein:

(i) the inorganic fibers consist essentially of silicon carbide fibers;

(ii) the ceramic matrix material is an alkaline earth aluminosilicate glass-ceramic matrix is a glass-ceramic selected from the group consisting of:

I. glass-ceramics wherein the predominant crystal phase is selected from the group of triclinic anorthite ($CaO,SrO \cdot Al_2O_3 \cdot 2SiO_2$) and its pseudo-binaries with mullite ($3Al_2O_3 \cdot SiO_2$), cordierite ($2MgO \cdot 2Al_2O_3 \cdot 5SiO_2$), barium osumilite ($BaO \cdot 2MgO \cdot 3Al_2O_3 \cdot 9SiO_2$), albite solid solution ($Na_2O \cdot Al_2O_3 \cdot 6SiO_2$), $Al_2O_3$, $SiO_2$, $CaO \cdot SiO_2$, and gehlenite ($2CaO \cdot Al_2O_3 \cdot SiO_2$); and II. internally nucleated glass-ceramics wherein the predominant crystal phase consists essentially of triclinic anorthite (CaO,SrO·Al$_2$O$_3$·SiO$_2$) and at least one of mullite and α-alumina, the alumina content of the glass-ceramic being from 10-50 mole percent in excess of that of stoichiometric triclinic anorthite; and (iii) prior to the step of embedding the fibers in the matrix material the fibers are first provided with a vapor-deposited boron nitride surface coating.

5. A method in accordance with claim 4 wherein the fibers and matrix material are consolidated to a dense ceramic matrix composite article by hot pressing to a temperature in the range of about 1200°-1360° C. at a pressure in the range of about 1500-3000 psi.

* * * * *